United States Patent
Hong et al.

(10) Patent No.: US 10,268,271 B2
(45) Date of Patent: Apr. 23, 2019

(54) HAPTIC DISPLAY DEVICE AND METHOD OF DRIVING THE SAME

(71) Applicant: SAMSUNG DISPLAY CO., LTD., Yongin-si, Gyeonggi-do (KR)

(72) Inventors: Won Ki Hong, Yongin-si (KR); Hak Sun Kim, Yongin-si (KR); Beom Shik Kim, Yongin-si (KR); Jong Seo Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 282 days.

(21) Appl. No.: 15/247,769

(22) Filed: Aug. 25, 2016

(65) Prior Publication Data

US 2017/0160803 A1    Jun. 8, 2017

(30) Foreign Application Priority Data

Dec. 2, 2015  (KR) ......................... 10-2015-0170532

(51) Int. Cl.
| | |
|---|---|
| *G06F 3/01* | (2006.01) |
| *G06F 3/044* | (2006.01) |
| *G06F 3/041* | (2006.01) |
| *G06K 9/00* | (2006.01) |
| *G09G 3/3266* | (2016.01) |
| *G09G 3/3275* | (2016.01) |

(52) U.S. Cl.
CPC .............. *G06F 3/016* (2013.01); *G06F 3/044* (2013.01); *G06F 3/0416* (2013.01); *G06K 9/00268* (2013.01); *G06F 2203/04108* (2013.01); *G06K 2009/00322* (2013.01); *G09G 3/3266* (2013.01); *G09G 3/3275* (2013.01); *G09G 2310/08* (2013.01); *G09G 2330/021* (2013.01)

(58) Field of Classification Search
CPC .......... G06F 3/016; G06F 19/00; G06F 3/017; G06F 2203/013; G06F 3/0416; G06F 2203/014; G06F 2203/04809; G06F 3/041; G06F 3/044; G06F 1/1626; G06F 2203/04106; G06F 3/03547; G06F 3/0412; A61B 5/7455; A61M 2205/582
See application file for complete search history.

(56) References Cited

U.S. PATENT DOCUMENTS

| | | | |
|---|---|---|---|
| 8,686,952 B2 | 4/2014 | Burrough et al. | |
| 2007/0152974 A1* | 7/2007 | Kim | G06F 3/016 345/168 |

(Continued)

FOREIGN PATENT DOCUMENTS

KR    10-2012-0075064 A    7/2012

OTHER PUBLICATIONS

Baojin Chu, "PVDF-Based Copolymers, Terpolymers and their Multi-Component Material Systems for Capacitor Applications," Pennsylvania State University, May 2008, 184 pages.

*Primary Examiner* — Koosha Sharifi-Tafreshi
(74) *Attorney, Agent, or Firm* — Innovation Counsel LLP

(57) ABSTRACT

There are provided a display device and a method of driving the same. The display device includes a haptic panel configured for a predetermined haptic driving, a haptic driver configured to control supply of a haptic driving voltage to the haptic panel, and a controller configured to receive at least one of user information and user environment information and to determine the haptic driving voltage according to the received user information and user environment information.

12 Claims, 8 Drawing Sheets

(56) References Cited

U.S. PATENT DOCUMENTS

| | | | |
|---|---|---|---|
| 2009/0167704 A1* | 7/2009 | Terlizzi | G06F 3/016 |
| | | | 345/173 |
| 2012/0162113 A1 | 6/2012 | Lee | |
| 2014/0098038 A1* | 4/2014 | Paek | G06F 1/1692 |
| | | | 345/173 |
| 2014/0101545 A1 | 4/2014 | Paek et al. | |
| 2014/0119569 A1* | 5/2014 | Peeler | H04B 15/00 |
| | | | 381/94.1 |
| 2015/0009168 A1* | 1/2015 | Levesque | H04M 19/04 |
| | | | 345/174 |
| 2015/0324049 A1* | 11/2015 | Kies | G06F 3/0414 |
| | | | 345/156 |
| 2016/0306458 A1* | 10/2016 | Hong | G06F 3/044 |

* cited by examiner

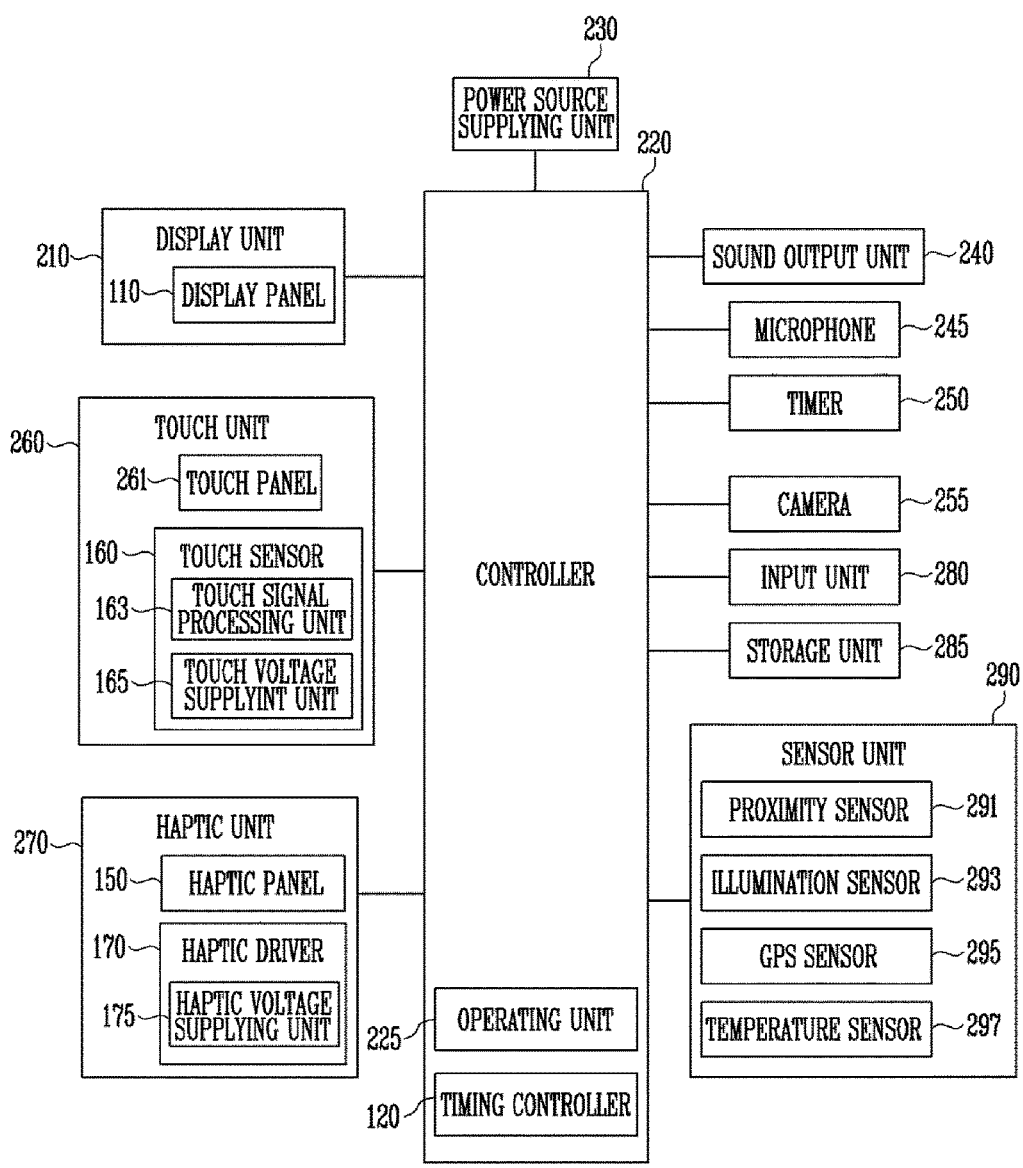

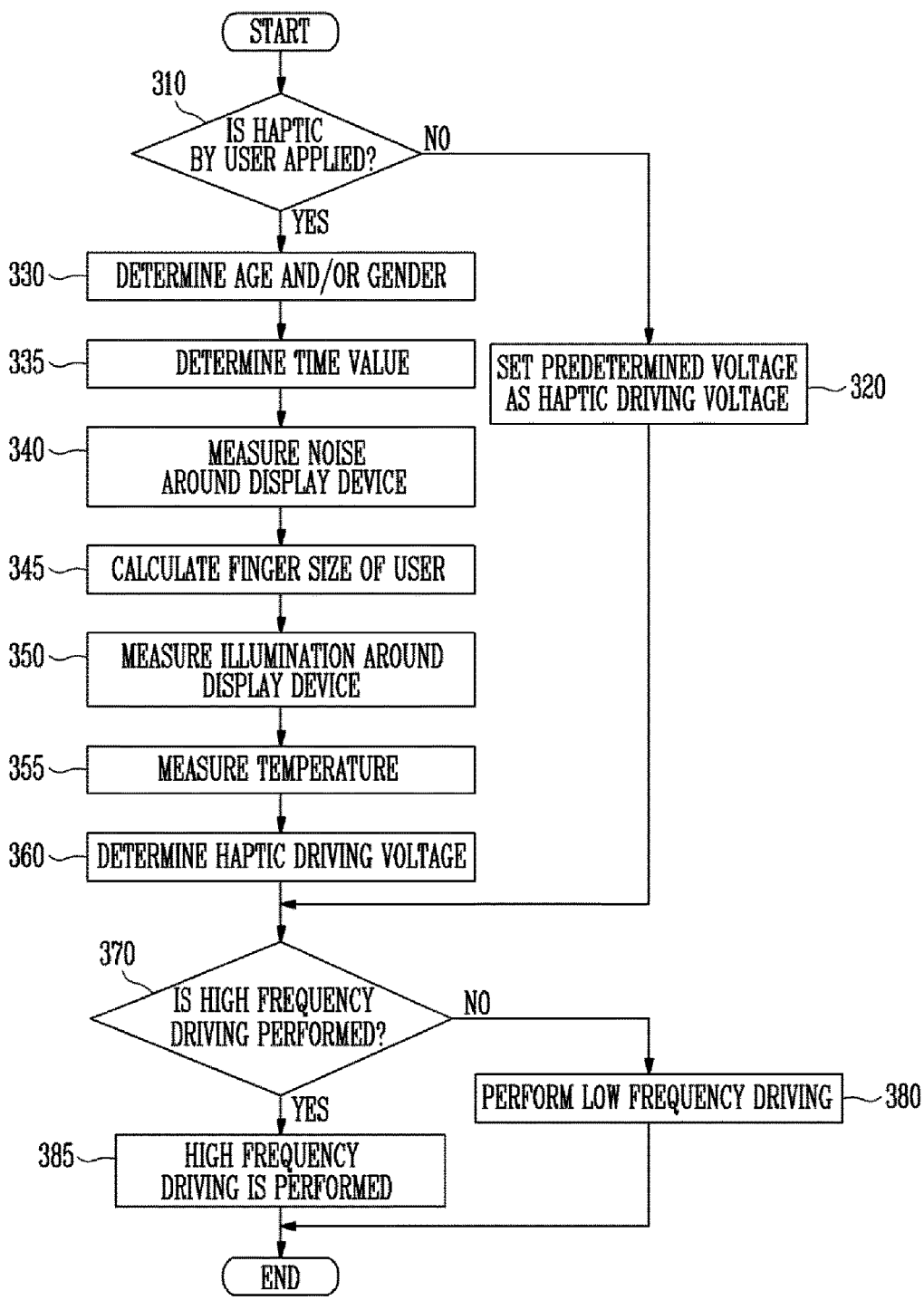

HAPTIC DISPLAY DEVICE AND METHOD OF DRIVING THE SAME

CROSS-REFERENCE TO RELATED APPLICATION

This application claims priority to, and the benefit of, Korean Patent Application No. 10-2015-0170532 filed on Dec. 2, 2015 in the Korean Intellectual Property Office, the entire contents of which are incorporated herein by reference in their entirety.

BACKGROUND

1. Field

An embodiment of the present invention relates generally to display devices. More specifically, embodiments of the present invention relate to haptic display devices and methods of driving the same.

2. Description of the Related Art

Display devices have found wide use in devices such as computer monitors, TV sets, and mobile phones. The display devices that display images by using digital data include, for example, a cathode ray tube (CRT) display device, a liquid crystal display (LCD), a plasma display panel (PDP), and an organic light emitting display device (OLED).

In a conventional art, the display device transmits an image and sound, engaging only the user's visual sense and auditory sense. However, recently, haptic technology capable of transmitting a sense of touch corresponding to an image when touch is performed by a pointer such as a finger or a stylus pen is increasingly applied to the display device including a touch screen.

Haptic technology is widely applied to display devices such as mobile apparatuses, monitors, and television sets. On the other hand, sensitivity to haptic input may vary in accordance with a user and/or an environment around the user. Therefore, it is necessary to perform haptic driving in accordance with the user and/or the environment around the user.

SUMMARY

An embodiment of the present invention relates to a display device to which haptic technology in accordance with a user and/or an environment of the user is applied, and a method of driving the same.

Another embodiment of the present invention relates to a method of controlling a haptic driving voltage to reduce power consumption of a display device.

Another embodiment of the present invention relates to a display device capable of controlling a haptic vibration magnitude in accordance with an environment around or proximate to a user, to increase convenience of the user, as well as a corresponding driving method.

Objects of the present invention are not limited to the above and other objects that are not mentioned may be clearly understood to those skilled in the art from the following.

A display device according to an embodiment of the present invention includes a haptic panel configured for a predetermined haptic driving, a haptic driver configured to control supply of a haptic driving voltage to the haptic panel, and a controller configured to receive at least one of user information and user environment information and to determine the haptic driving voltage according to the received user information and user environment information.

The controller may be further configured to determine a haptic driving frequency in accordance with an executed application and to control the haptic driver so that the haptic panel is driven according to the haptic driving frequency.

The haptic driver may include a piezoelectric device and a haptic actuator including at least one of a lead zirconate titanate (PZT), Polyvinylidene fluoride (PVDF), terpolymer, eccentric rotating mass (ERM), linear resonant actuator (LRA), or electroactive polymer (EAP) actuator.

The controller may be configured to receive at least one of an age, a gender, and a finger size of a user.

The haptic panel can include a touch sensor and the controller is further configured to determine a finger size of a user according to a recharge time after discharge of the touch sensor.

The haptic panel may include a touch sensor and the controller determines a finger size of a user according to an amount of discharge of the touch sensor.

The controller can receive at least one of a time, a level of noise proximate to the display device, a level of illumination proximate to the display device, and a temperature proximate to the display device.

The display device may further include a timer configured to measure the time, a microphone configured to measure the level of noise proximate to the display device, an illumination sensor configured to measure the level of illumination proximate to the display device, and a temperature sensor configured to measure the temperature proximate to the display device.

A method of driving a display device according to an embodiment of the present invention includes receiving at least one of user information and user environment information, determining a haptic driving voltage according to the received user information and user environment information, supplying the haptic driving voltage to a haptic panel, and performing haptic driving in accordance with the haptic driving voltage.

The performing haptic driving further includes determining a haptic driving frequency according to an executed application and driving the haptic panel according to the haptic driving frequency.

The receiving may further include receiving at least one of information corresponding to an age, a gender, and a finger size of a user.

The receiving may further include determining a finger size of a user according to a recharge time after discharge of a touch sensor.

The receiving may further include determining a finger size of a user according to an amount of discharge of a touch sensor.

The receiving may further include receiving at least one of information corresponding to a time, a level of noise proximate to a display device, a level of illumination proximate to the display device, and a temperature proximate to the display device.

According to an embodiment of the present invention, it is possible to provide a display device to which haptic technology in accordance with a user and/or an environment around the user is applied, as well as a method of driving the same.

According to another embodiment of the present invention, it is possible to provide a method of modulating a haptic driving voltage to reduce power consumption of a display device.

According to another embodiment of the present invention, it is possible to provide a display device capable of controlling a haptic vibration magnitude in accordance with an environment around a user to increase convenience of the user, as well as a method of driving the same.

Effects of the present invention are not limited to the above and other effects that are not mentioned may be clearly understood to those skilled in the art from the following.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. The various figures thus may not be to scale. It will be understood that when an element is referred to as being "between" two elements, it can be the only element between the two elements, or one or more intervening elements may also be present. Like reference numerals refer to like elements throughout.

FIG. 2 is a block diagram of a terminal including a display device according to an embodiment of the present invention;

FIG. 3 is a view illustrating an example of a method of driving a display device according to an embodiment of the present invention;

DETAILED DESCRIPTION

Figure 1:
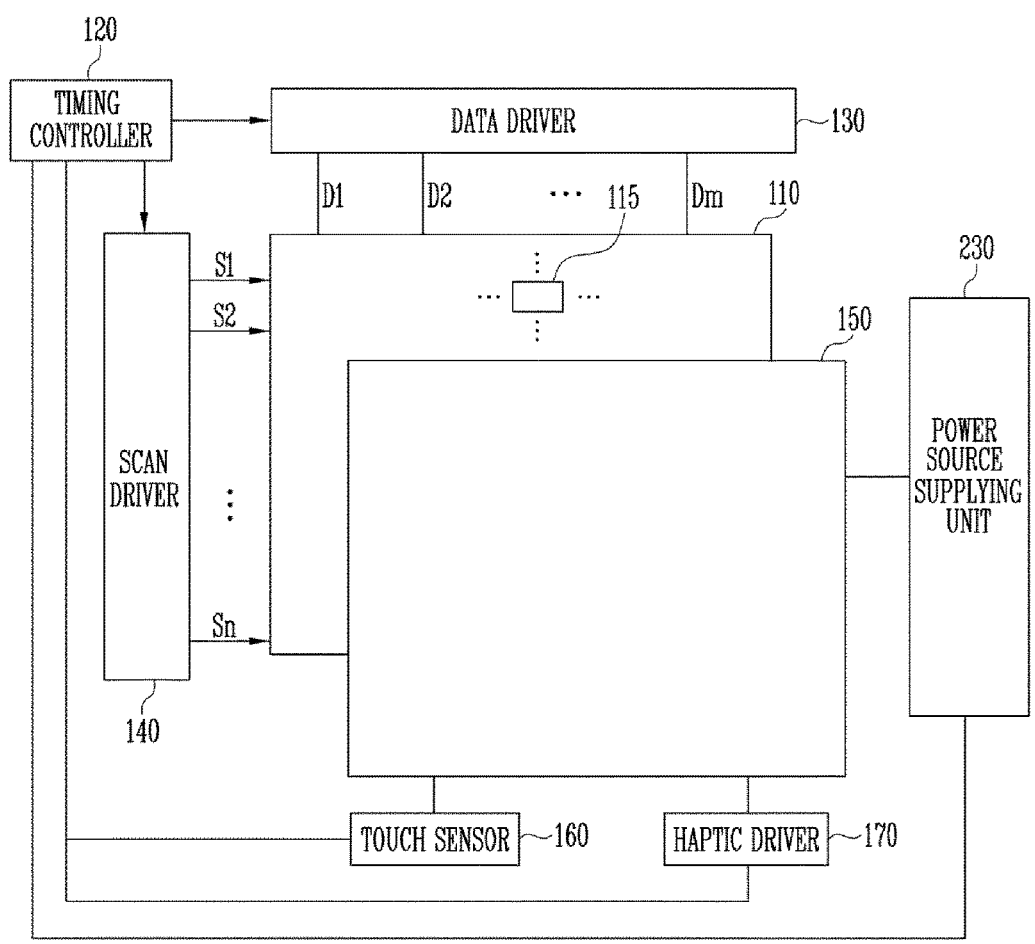
FIG. 1 is a block diagram of a display device according to an embodiment of the present invention.

Hereinafter, embodiments of the present invention will be described in detail with reference to the accompanying drawings.

In describing the present invention, if an embodiment has been well known in the art to which the present invention pertains and technical contents are not directly related to an embodiment of the present disclosure, descriptions thereof will be omitted. This is to allow the embodiment of the present invention to be clearly understood without obscuring the gist of the embodiment of the present disclosure.

It is to be understood that when one element is referred to as being "connected to" or "coupled to" another element, it may be connected directly to or coupled directly to another element or be connected to or coupled to another element, having the other element intervening therebetween. In addition, in the following description, and the word 'including' does not preclude the presence of other components and means that an additional component is included in the technical concept of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

Also, elements of the embodiments of the present invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the present invention unless it diverts from the essence of the present invention.

Also, some of the elements may be optional to merely enhance the performance, rather than being essential to perform a constitutional function. The present invention may be implemented by using only the elements requisite for implement the essence of the present invention, excluding elements used to merely enhance the performance, and a structure including only the essential elements excluding the optional elements merely used to enhance the performance is also included in the scope of the present invention.

In describing embodiments of the present invention, a detailed description of known techniques associated with the present invention unnecessarily obscures the gist of the present invention, it is determined that the detailed description thereof will be omitted. Moreover, the terms used henceforth have been defined in consideration of the functions of the present invention, and may be altered according to the intent of a user or operator, or conventional practice. Therefore, the terms should be defined on the basis of the entire content of this specification. All numerical values are approximate, and may vary. All examples of specific materials and compositions are to be taken as nonlimiting and exemplary only. Other suitable materials and compositions may be used instead.

FIG. 1 is a block diagram of a display device according to an embodiment of the present invention. FIG. 2 is a block diagram of a terminal including a display device according to an embodiment of the present invention.

Referring to FIG. 1, the display device according to the embodiment of the present invention may include a display panel 110 including a plurality of pixels (not shown), a scan driver 140 for transmitting a plurality of scan signals to the display panel 110, a data driver 130 for transmitting a plurality of data signals to the display panel 110, a power source supplying unit 230 for supplying a driving voltage to the display panel 110, and a timing controller 120 for supplying a plurality of control signals for controlling the scan driver 140, the data driver 130, and the power source supplying unit 230.

At this time, the display device according to the embodiment of the present invention may also include a touch sensing unit 160, a haptic driver 170, and a haptic panel 150. The haptic panel 150 may include a touch panel, touch sensors, and sensing electrodes including a transmitting electrode and a receiving electrode. At this time, when a touch event occurs at a specific point on the haptic panel 150, the touch sensing unit 160 may sense a position at which the touch event occurs in accordance with a sensing signal from a touch sensor.

The haptic driver 170 may control the haptic panel 150 to perform predetermined haptic driving in accordance with a predetermined condition. For example, the haptic driving may apply haptic vibration to the specific position when a user touches a specific position of the haptic panel 150 or, when a specific application is executed, the haptic driving may apply haptic vibration to a specific position of the haptic panel 150 in accordance with execution content of the application. In FIG. 1, the touch panel is illustrated as being included in the haptic panel 150. However, the present invention is not limited thereto. As one example, the touch panel may be separate from the haptic panel 150.

In embodiments, the haptic driving may generate various touch effects obtained by arrangement of a pin that vertically moves with respect to a skin contact surface, a spraying force or an absorbing force of the air through a spraying hole or an absorbing hole, flickering against a skin surface, contact of an electrode, stimulation such as electrostatic force, and reproduction of cold or warm feelings using a device capable of absorbing or emitting heat as well as haptic vibration.

The haptic driver 170 may be implemented so that the user may feel touch through a muscle sense such as a finger or an arm, and may transmit the touch through direct contact.

In the display panel 110, a plurality of pixels is arranged in a matrix. The pixels 115 may respectively emit light components corresponding to driving currents transmitted in accordance with the data signals transmitted from the data driver 130. At this time, the pixels may include light emitting elements such as organic light emitting diodes (OLEDs). In addition, in accordance with a method of driving the OLEDs, the display device may be a passive matrix organic light emitting display device (PMOLED) or an active matrix OLED (AMOLED). At this time, according to an embodiment, the display device may be an AMOLED.

A plurality of scan lines S1 to Sn formed in a row direction to transmit the scan signals from the scan driver 140, and a plurality of data lines D1 to Dm formed in a column direction to transmit the data signals from the data driver 130, are respectively arranged in the plurality of pixels included in the display unit 110.

That is, among the plurality of pixels 115, the pixel 115 positioned in a jth pixel row and a kth pixel column is connected to a corresponding scan line Sj and a corresponding data line Dk. However, the present invention is not limited thereto. For example, the scan driver 140 may be implemented by a plurality of drivers. In addition, the pixel 115 may be connected to a plurality of scan lines.

Each of the pixels 115 includes a pixel circuit for supplying a current to an OLED in accordance with a corresponding data signal, and the OLED may emit light with predetermined brightness in accordance with the supplied current. At this time, a first power source voltage and a second power source voltage that are required for operation of the display panel 110 may be transmitted from the power source supplying unit 230.

The scan driver 140 for applying the plurality of scan signals to the display panel 110 is connected to the plurality of scan lines S1 to Sn, and may respectively transmit the plurality of scan signals to corresponding scan lines S1 to Sn. The scan driver 140 generates the scan signals, and may transmit the generated scan signals to appropriate scan lines S1 to Sn in accordance with a scan driving control signal supplied from the timing controller 120. When the scan signals are supplied to the scan lines S1 to Sn, the pixels 115 are selected. Here, the scan driver 140 may simultaneously or sequentially supply the scan signals to the scan lines S1 to Sn in response to a driving method.

The data driver 130 generates the plurality of data signals from an image data signal transmitted from the timing controller 120, and may transmit the generated data signals to the plurality of data lines D1 to Dm connected to the display panel 110. The data driver 130 may be driven by a data driving control signal supplied by the timing controller 120.

The timing controller 120 may receive timing signals from an external source (not shown). These timing signals may include a horizontal synchronizing signal, a vertical synchronizing signal, a data enable signal, and a dot clock. Control signals to be respectively transmitted to the data driver 130 and the gate driver 140 may be generated by using the received signals. In addition, the timing controller 120 receives input image data from an external source, converts the received input image data, and may supply output image data to the data driver 130.

According to an embodiment, the gate driver 140, the data driver 130, and the timing controller 120 may be implemented in one display driver IC as hardware.

The plurality of pixels 115 included in the display panel 110 receives corresponding scan signals so that the OLEDs emit light components by data voltages corresponding to the data signals. In this manner, an image may be displayed.

The power source supplying unit 230 may supply a voltage required for operation of the haptic panel 150, as well as a first power source voltage and a second power source voltage that may be required for the operation of the display panel 110. That is, the power source supplying unit 230 may supply a touch power source voltage to the haptic panel 150 in accordance with a power source supplying unit control signal of the timing controller 120. In addition, the power source supplying unit 230 may supply a haptic driving voltage to the haptic panel 150 in accordance with the power source supplying unit control signal of the timing controller 120. The haptic panel 150 receives the haptic driving voltage in accordance with control of the haptic driver 170, and may perform haptic operation.

On the other hand, as illustrated in FIG. 2, according to an embodiment, the display device may include a touch voltage supplying unit 165 for supplying the touch power source voltage and a haptic voltage supplying unit 175 for supplying the haptic driving voltage, where the haptic voltage supplying unit 175 is a different voltage supply from the power source supplying unit 230.

At this time, according to an embodiment, the touch sensing unit 160 may include the touch voltage supplying unit 165 for supplying the touch power source voltage. The touch voltage supplying unit 165 may supply the touch power source voltage to the haptic panel 150 in accordance with control of the timing controller 120.

In addition, according to an embodiment, the haptic driver 170 may include the haptic voltage supplying unit 175 for supplying the haptic driving voltage. In the embodiment shown in FIG. 2, the touch voltage supplying unit 165 and the haptic voltage supplying unit 175 are separate from the power source supplying unit 230. However, the present invention is not limited thereto. The touch voltage supplying unit 165 and the haptic voltage supplying unit 175 may be included in the power source supplying unit 230.

In the display device according to the embodiment of the present invention, the timing controller 120 may perform control so that haptic driving may vary in accordance with a user and/or an environment around the user.

Since sensitivity of a receptor varies in accordance with the age, gender, finger size, any calluses, hair and the like of the user, sensitivity to haptic stimuli may vary by user. In addition, the sensitivity to haptic input may vary in accordance with the user environment such as time zone, temperature, noise, illumination, position (a place) and the like. Therefore, in the display device according to the embodiment of the present invention, haptic driving varies in accordance with characteristics of the user such as the age, the gender, and the personality of the user and the user environment such as the time zone, the temperature, the noise, the illumination, and the position so that user suitable haptic stimuli may be provided.

For this purpose, the timing controller 120 may control the haptic driving voltage supplied to the haptic panel 150 by controlling the power source supplying unit 230 and/or the haptic voltage supplying unit 175. For example, the timing controller 120 receives user information and/or user environment information collected through the haptic driver 170, and may determine the haptic driving voltage in accordance with the received information. The timing controller 120 may transmit a control signal to the power source supplying unit 230 to supply the haptic driving voltage to the haptic panel 150 in accordance with the determined haptic driving voltage. Therefore, the power source supplying unit 230 may supply the haptic driving voltage to the haptic panel 150 in accordance with the received haptic driving voltage information.

According to an embodiment, the timing controller 120 receives the user information and/or the user environment information collected through the haptic driver 170, and may determine the haptic driving voltage in accordance with the received information. The timing controller 120 may transmit the control signal for the haptic driver 170 thereto, to supply the haptic driving voltage to the haptic panel 150 in accordance with the determined haptic driving voltage. The haptic driver 170 receives information on the haptic driving voltage from the timing controller 120, and may supply the haptic driving voltage to the haptic panel 150 in accordance with the received information.

In other embodiments, for user suitable haptic driving in accordance with the user and/or the environment around the user, the haptic driver 170 may collect the user information and/or the user environment information. For this purpose, as illustrated in FIG. 2, the display device according to the embodiment of the present invention may include a sound output unit 240, a microphone 245, a timer 250, a camera 255, an input unit 280, a storage unit 285, and a sensor unit 290.

More specifically, referring to FIG. 2, the display device according to the embodiment of the present invention may include a controller 220, a display unit 210, a power source supplying unit 230, a touch unit 260, a haptic unit 270, the sound output unit 240, the microphone 245, the timer 250, the camera 255, the input unit 280, the storage unit 285, and the sensor unit 290.

The controller 220 controls substantially the entire operation of the display device. The controller 220 controls entities of the display device so that the display device may collect the user information and/or the user environment information and may control the haptic unit 270 to perform haptic driving operations. On the other hand, the controller 220 may include the timing controller 120. Since detailed description of the timing controller 120 was made, detailed description thereof will not be repeated here. At this time, the timing controller 120 controls the entities of the display device so that the display device may collect the user information and/or the user environment information, and may control the haptic unit 270 to perform haptic driving. On the other hand, according to an embodiment, the controller 220 may further include an operating unit 225 for performing various operations of the display device.

The display unit 210 includes the display panel 110 and may include the data driver 130 and the scan driver 140.

The touch unit 260 may include a touch panel 261 and the touch sensing unit 160. The touch sensing unit 160 may include a touch signal processing unit 163 and the touch voltage supplying unit 165. When the touch event occurs in the touch panel 261, the touch signal processing unit 163 senses the touch event and may calculate a touch position. For example, the touch signal processing unit 163 may calculate the touch position by applying a driving signal to the touch panel 261 through a transmitting electrode and, when the touch event occurs, receiving information on a change in mutual capacitance through a receiving electrode. The touch voltage supplying unit 165 may apply a predetermined touch voltage in accordance with control of the controller 220 (or the timing controller 120), for sensing the touch event.

The haptic unit 270 may include the haptic panel 150 and the haptic driver 170. The haptic driver 170 may include the haptic voltage supplying unit 175. Since detailed description of the haptic panel 150 for performing haptic driving is presented above, detailed description thereof will not be repeated here. The haptic voltage supplying unit 175 may supply the haptic driving voltage to the haptic panel 150 in accordance with control of the controller 220 (or the timing controller 120).

In FIG. 2, the touch panel 261 and the haptic panel 150 are separate from each other. However, the present invention is not limited thereto. For example, the haptic panel 150 may include a touch panel. At this time, the haptic panel 150 may include the touch sensor. In addition, in FIG. 2, the power source supplying unit 230, the touch voltage supplying unit 165, and the haptic voltage supplying unit 175 are separate from each other. However, the present invention is not limited thereto. For example, the power source supplying unit 230 may include the touch voltage supplying unit 165 and the haptic voltage supplying unit 175. In addition, in FIG. 2, the display panel 110 is illustrated as being separate from the touch panel 261 and the haptic panel 150. However, the present invention is not limited thereto. For example, the display panel 110 may include both the touch panel 261 and the haptic panel 150. At this time, the display panel 110 may include a haptic driving device and the touch sensor. In addition, in FIG. 2, the controller 220 and the haptic driver 170 are separate from each other. However, the present invention is not limited thereto. For example, the haptic driver 170 may be included in the controller 220.

On the other hand, the sound output unit 240 outputs sound or audio for the display device, e.g., may output audio data such as an alarm signal stored in the storage unit 285 or may output a sound signal received from a communication unit (not shown).

The microphone 245 may recognize the voice of a user or a sound around the display device. For example, it may receive an external sound signal and may process the received external sound signal into electrical data.

The camera 255 may process an image frame such as a still image or a moving picture obtained by an image sensor in a photograph mode. The processed image frame may be displayed in the display unit 210. In addition, the image frame may be stored in the storage unit 285.

The timer 250 capable of measuring current time may include a watch.

The input unit 280 generates input data for a user controlling operation of the display device. The input unit 280 may be implemented to include a button positioned on a front surface, a rear surface, or a side surface of the display device. According to an embodiment, the input unit 280 may be implemented by the touch unit 260 of the display device. Although not shown, the input unit 280 may include a keypad, a dome switch, a jog wheel, a jog switch, or the like.

The storage unit 285 may store a program for processing and controlling the controller 220, and may temporarily store input/output data items (for example, image data, voice data, user information data, etc. that are received from the outside). User frequencies of the respective data items may be stored in the storage unit 285.

The storage unit 285 may include at least one type of storage medium among a flash type memory, a hard disk type memory, a multimedia card micro type memory, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The display device may operate in relation to web storage that performs a storage function of the storage unit 285 through the Internet.

The sensor unit 290 may sense a position of the display device, presence of user contact, a direction of the display device, illumination around the display device, temperature, and time. The sensor unit 290 may include, for example, a proximity sensor 291, an illumination sensor 293, a global positioning system (GPS) sensor 295, or a temperature sensor 297.

The proximity sensor 291 detects the presence of an object that approaches a predetermined detection surface or an object that exists around the predetermined detection surface, by using an electromagnetic field or ultraviolet (UV) rays without mechanical contact. The proximity sensor 291 has a longer life and higher utilization than a contact type sensor. The proximity sensor 291 may be, for example, a transmissive photoelectric sensor, a direct reflection type photoelectric sensor, a mirror reflection type photoelectric sensor, a high frequency oscillation type proximity sensor, a capacitance type proximity sensor, a magnetic proximity sensor, or UV proximity sensor.

When an object is close to but not contacting the proximity sensor 291, its detection may be referred to as "proximity touch". When the pointer actually contacts the touch panel 261, its detection may be referred to as "contact touch". In the touch panel 261, a position in which the proximity touch is detected may mean a position in which the pointer vertically corresponds to the touch panel 261 when the proximity touch is performed on the pointer. Hereinafter, touch may refer to the proximity touch as well as the contact touch.

The illumination sensor 293 may sense illumination around the display device and may transmit information on the sensed illumination to the storage unit 285. This information may be stored in the storage unit 285.

The position sensor 295 as an entity for obtaining a current position of the display device may include a GPS sensor as a representative example. According to current technology, the GPS sensor may correctly calculate information on a three dimensional current position (latitude, longitude, and altitude) by calculating information on a distance from no less than three satellites and correct time information, and applying trigonometry to the calculated information. Currently, a method of calculating position and time information by using three satellites and correcting an error of the calculated position and time information by using the other one satellite is widely used. In addition, the GPS sensor may calculate speed information by continuously calculating a current position in real time.

The temperature sensor 297 obtains temperature around the display device. The temperature sensor 297 may be a resistance temperature diode (RTD), a negative temperature coefficient (NTC) thermistor, a positive temperature coefficient (PTC) thermistor, or a critical temperature resistor (CTR). At this time, the temperature sensor may obtain temperature around the display device by using a change in resistance in accordance with the temperature.

The haptic driver 170 may collect the user information and/or the user environment information in accordance with control of the controller 220. That is, the controller 220 may transmit a control signal for allowing the haptic driver 170 to collect the user information and/or the user environment information. The haptic driver 170 may collect the user information and/or the user environment information from entities of the display device in accordance with the received control signal. Then, the haptic driver 170 may transmit the collected user information and/or user environment information to the controller 220. The controller 220 determines the haptic driving voltage by using the received user information and/or user environment information and may transmit information on the determined haptic driving voltage to the haptic voltage supplying unit 175. The haptic voltage supplying unit 175 may supply the haptic driving voltage to the haptic panel 150. According to an embodiment, the haptic driver 170 may directly determine the haptic driving voltage by using the collected user information and/or user environment information. Then, in accordance with the determined haptic driving voltage, the haptic voltage supplying unit 175 may supply the haptic driving voltage to the haptic panel 150. At this time, the haptic driver 170 may transmit the information on the determined haptic driving voltage to the controller 220.

According to an embodiment, the controller 220 controls the entities of the display device and may collect the user information and/or the user environment information. Then, the controller 220 may determine the haptic driving voltage by using the collected user information and/or user environment information. The controller 220 transmits the information on the determined haptic driving voltage to the haptic driver 170. The haptic driver 170 may control the haptic voltage supplying unit 175 to supply the haptic driving voltage to the haptic panel 150 in accordance with the received information on the haptic driving voltage.

Hereinafter, for convenience sake, the controller 220 is illustrated as collecting the user information and/or the user environment information. However, the present invention is not limited thereto. For instance, the haptic driver 170 may collect the user information and/or the user environment information instead.

The controller 220 may collect information on the age, the gender, and the finger size of the user as input user information.

The user information may be collected through input data of the user that is input through the input unit 280. For example, the controller 220 may display a pop-up window that allows information on the age, the gender, and the finger size of the user to be input in the display unit 210. Then, the controller 220 may receive the information from the user through the input unit 280. Then, the controller 220 may collect the user information by storing the input user information in the storage unit 285.

According to an embodiment, the user information may be collected by using the camera 255. That is, the controller 220 controls the camera 255 to photograph the face of the user, and may extract information such as the age and the gender of the user by using photographed face picture information. For example, after calculating a length of the face, a distance between the eyes, a width of the forehead, and a ratio among the ears, the eyes, the mouth, and the nose of the user based on a picture of the face of the user photographed by the camera 255, the length of the face, the distance between the eyes, the width of the forehead, and the ratio among the ears, the eyes, the mouth, and the nose of the user are compared with information on an average male/female face or information on a face at an average age, so that the information on the age and the gender of the user may be extracted. At this time, the controller 220 informs the display unit 210 that photographing will be performed to collect the user information, and may display a pop-up window that informs whether the photographing is to be performed. Then, the controller 220 may perform control so that user information is collected via camera 255 only when user consent is received through the input unit 280.

In addition, the controller 220 may extract the information on the user finger size from a change in capacitance of a touch sensor. At this time, according to an embodiment, when a command to collect the information on the user finger size is received from the user, the user finger size may be calculated by using the amount of change in capacitance of the touch sensor included in the touch panel 261. A method of calculating the user finger size by using the amount of change in capacitance of the touch sensor will be described in further detail below.

The controller 220 may collect information on current time, noise around the user, illumination around the user, and temperature, as the user environment information.

The controller 220 may receive information on the current time by using the timer 250. According to an embodiment, the controller 220 may receive information on the current time from the user through the input unit 280. Then, the controller 220 may store the received information items in the storage unit 285 as user environment information.

In addition, the controller 220 may determine information on the noise around the display device by using the microphone 245. For example, the controller 220 may receive sound around the display device through the microphone 245. Then, the controller 220 may determine the information on the noise around the display device by determining a magnitude of this noise. For example, the controller 220 may determine that the noise around the display device is large when the magnitude of the sound around the display device meets or exceeds a predetermined magnitude. According to an embodiment, the controller 220 may receive information on the noise around the display device from the user through the input unit 280. In addition, according to an embodiment, the controller 220 divides the magnitude of the sound into various levels, determines to which level the measured magnitude of the sound around the display device corresponds, and may store information on the corresponding level as the information on the noise around the display device.

Then, the controller 220 may measure information on the illumination around the display device by using the illumination sensor 293. According to an embodiment, the controller 220 may determine the illumination around the display device by using the information on the current time. For example, when the current time is 12 p.m., the controller 220 may determine that the illumination around the display device is in the lowermost level. According to the embodiment, the controller 220 may receive information on the illumination around the display device from the user through the input unit 280. In addition, according to an embodiment, the controller 220 divides a magnitude of the illumination into various levels, determines to which level a measured magnitude of the illumination around the display device corresponds, and may store information on the corresponding level as the information on the illumination around the display device.

The controller 220 may measure the temperature around the display device by using the temperature sensor 297. According to an embodiment, the controller 220 may determine the temperature around the display device by using information on the current time and date. For example, when the current date is January and the current time is 12 p.m., the controller 220 may determine that the temperature around the display device is about ten degrees above zero. When the current date is July and the current time is 12 p.m., the controller 220 may determine that the temperature around the display device is about 30 degrees above zero. According to an embodiment, the controller 220 may receive the information on the temperature around the display device from the user, through the input unit 280. In addition, according to an embodiment, the controller 220 divides a magnitude of the temperature into various levels, determines to which level the measured magnitude of the temperature around the display device corresponds, and may store information on the corresponding level as the information on the temperature around the display device.

Then, the controller 220 may determine a haptic driving method by using the collected user information and/or user environment information.

At this time, the controller 220 may store the collected user information and/or user environment information in the storage unit 285 in the form of a table. It is noted that the haptic driving voltage corresponding to the user information and/or the user environment information is stored in the table.

According to an embodiment, the controller 220 may change a haptic driving frequency in accordance with an executed application. That is, the controller 220 may determine whether high frequency driving or low frequency driving is required in accordance with the executed application. Then, when the high frequency driving is required, the haptic driving frequency may be set as a high frequency (for example, no less than 100 Hz).

According to an embodiment, the haptic driver 170 may include a piezoelectric device using secondary piezoelectricity. At this time, a haptic actuator of the haptic driver 170 may be a lead zirconate titanate (PZT), Polyvinylidene fluoride (PVDF), terpolymer, eccentric rotating mass (ERM), linear resonant actuator (LRA), or electroactive polymer (EAP) actuator. However, the present invention is not limited thereto.

FIG. 3 is a view illustrating an example of a method of driving a display device according to an embodiment of the present invention. FIGS. 4 to 6 are views illustrating an example of a method of calculating a size of a finger of a user in a display device according to an embodiment of the present invention. FIG. 7 is a view illustrating an example of a change in dielectric constant of terpolymer in accordance with temperature in a display device according to an embodiment of the present invention Referring to FIG. 3, in operation 310, the controller 220 may determine whether different haptic driving methods are to be performed in accordance with different users (i.e. haptic by user).

When it is determined that haptic by user is not applied, in operation 320, the controller 220 may determine that predetermined haptic driving is performed. For example, the controller 220 may set a predetermined voltage as the haptic driving voltage. At this time, the predetermined voltage may be referred to as a default haptic driving voltage $V_{default}$.

Alternatively, when it is determined that the haptic by user is not applied, the controller 220 may receive the user information and/or the user environment information through operations 330 to 355. At this time, any subset of the operations 330 to 355 may be performed. For example, only the operations 330 and 350 may be performed or all the operations 330 to 355 may be performed. In addition, the order of the operations 330 to 355 may vary. For example, after the operation 340 is performed, the operation 330 may be performed.

In the operation 330, the controller 220 may determine the age and/or the gender of the user. That is, as described above in connection with FIGS. 1 and 2, the controller 220 receives the age and/or the gender of the user in accordance with an input of the user, or may determine the age and/or the gender of the user by using the camera 255.

In the operation 335, the controller 220 may determine the information on the current time. That is, as described above in connection with FIGS. 1 and 2, the controller 220 may receive the information on the current time in accordance with the input of the user, or may receive the information on the current time by using the timer 250.

In the operation 340, the controller 220 may determine the noise around the display device. That is, as described above in connection with FIGS. 1 and 2, the controller 220 may receive the information on the noise around the display device in accordance with the input of the user, or may determine the information on the noise around the display device by using the microphone 245.

In the operation 345, the controller 220 may determine the finger size of the user. That is, as described above in connection with FIGS. 1 and 2, the controller 220 may receive the information on the finger size of the user in accordance with the input of the user, or may calculate the finger size of the user by using the amount of change in capacitance of the touch sensor included in the touch panel 261.

Figure 4A:
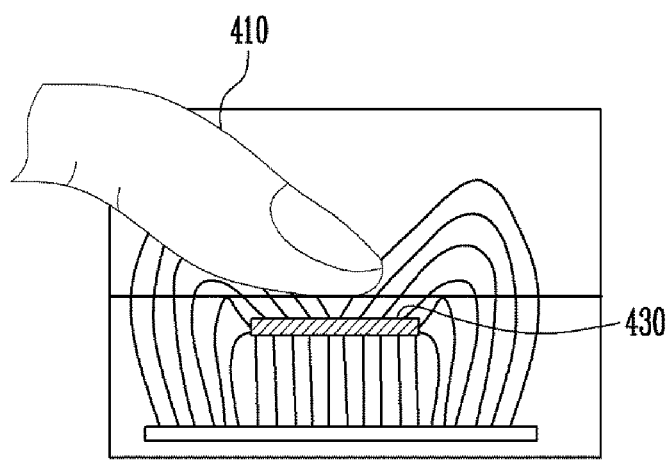
FIG. 4A, FIG. 4B, FIG. 5A, FIG. 5B, FIG. 6A and FIG. 6B are views illustrating an example of a method of calculating a size of a finger of a user in a display device according to an embodiment of the present invention.
Figure 4B:
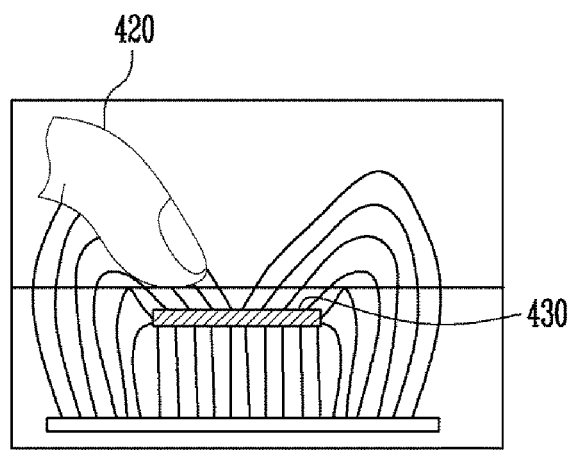

In detail, referring to FIG. 4A and FIG. 4B, when a finger 410 of the user is large as illustrated in FIG. 4A, a contact area between the finger 410 and a touch sensor 430 is large. When a finger 420 of the user is small as illustrated in FIG. 4B, a contact area between the finger 420 and the touch sensor 430 is small.

Figure 5A:
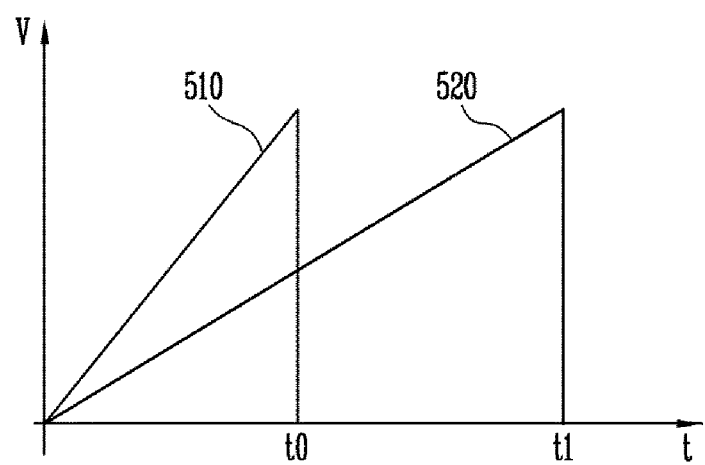
Figure 5B:
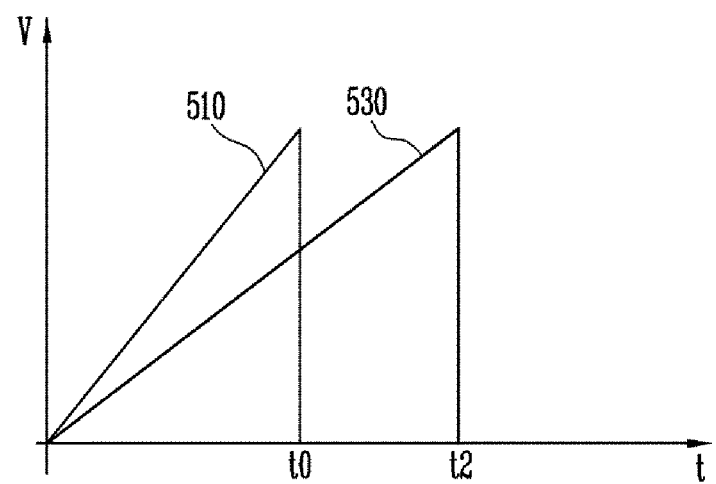

At this time, FIG. 5A and FIG. 5B illustrate a relationship between recharge times after discharge in accordance with the finger sizes of the user. Referring to FIG. 5A, basic charge time may be illustrated by 510. At this time, charge time may be t0. When a large finger 410 contacts the touch sensor 430, since a large amount of finger capacitance is formed, an amount of discharge by the finger 410 may be large. Therefore, recharge time may be t1 as illustrated in 520. When the finger 410 is large, it takes longer to recharge the touch sensor.

On the other hand, as illustrated in FIG. 5B, when the small finger 420 contacts the touch sensor 430, a small amount of finger capacitance is formed. Therefore, an amount of discharge by the finger 420 may be small. Thus, recharge time may be t2 as illustrated in 530. When the finger 420 is small, it takes a shorter time to recharge the touch sensor.

At this time, the recharge time t2 after the discharge by the small finger 420 may be smaller than the recharge time t1 after the discharge by the large finger 410.

Therefore, the controller 220 may determine the finger size of the user in accordance with the recharge time of the touch sensor 430. According to an embodiment, the controller 220 divides a length of the recharge time of the touch sensor 430 into various levels, determines to which level a measured length of the recharge time corresponds, and may store information on the corresponding level as the information on the finger size of the user.

Figure 6A:
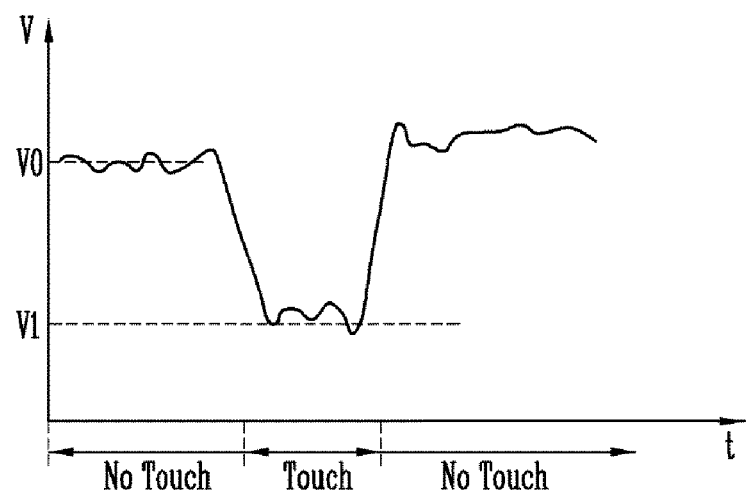
Figure 6B:
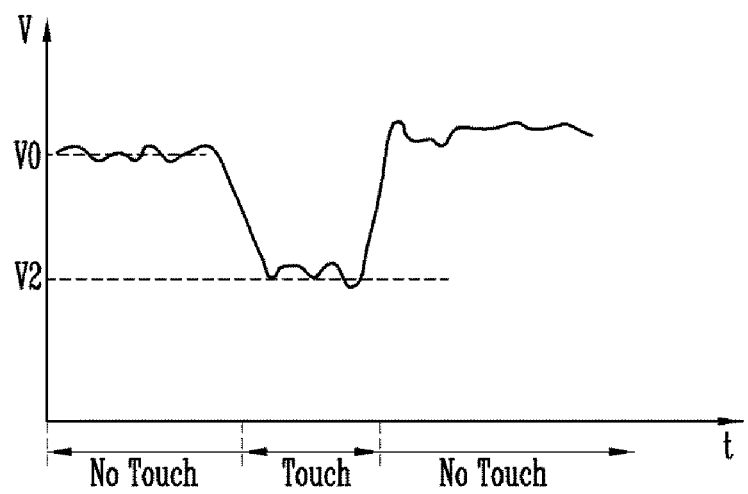
Figure 7:
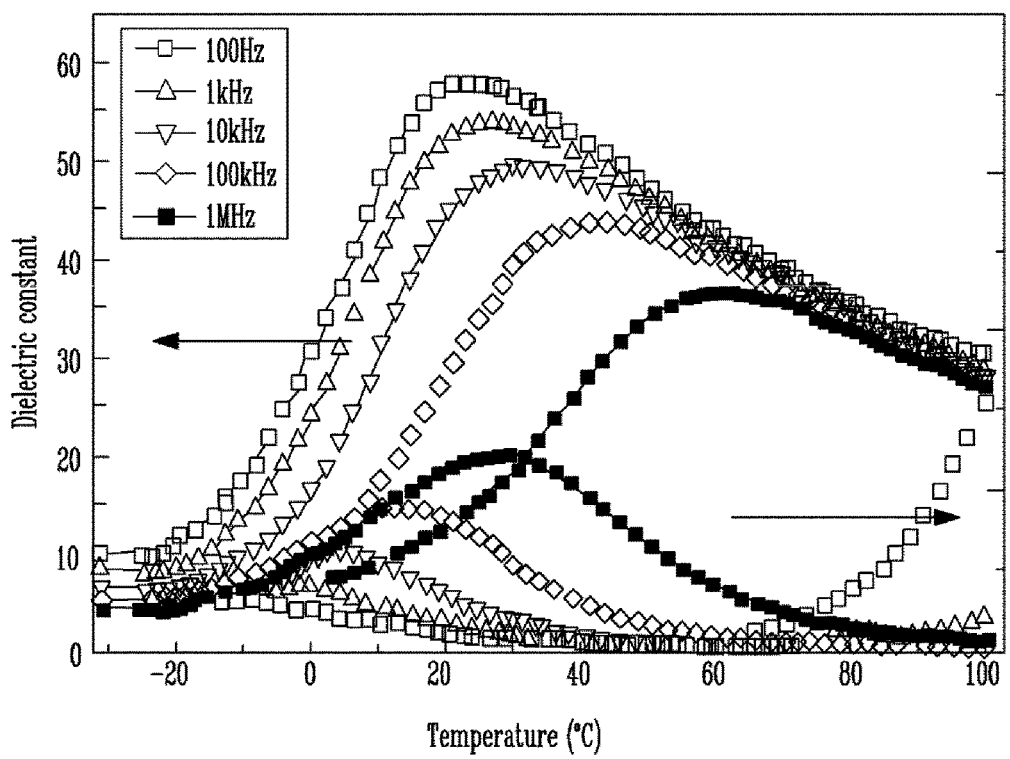
FIG. 7 is a view illustrating an example of a change in dielectric constant of terpolymer in accordance with temperature in a display device according to an embodiment of the present invention.

On the other hand, FIG. 6A and FIG. 6B illustrate a relationship between magnitudes of discharge of the touch sensor in accordance with touches, as a function of the finger sizes of the user. Referring to FIG. 6A, when the large finger 410 contacts the touch sensor 430, since a large amount of finger capacitance is formed, an amount of discharge by the finger 410 may be large. Therefore, a magnitude of a voltage of the touch sensor 430 due to discharge caused by touching the touch sensor 430 may be illustrated by V1. When the finger 410 is large, an amount of discharge V0 to V1 of the touch sensor 430 may be large.

On the other hand, as illustrated in FIG. 6B, when the small finger 420 contacts the touch sensor 430, a small amount of finger capacitance is formed. Therefore, an amount of discharge by the finger 420 may be small. Therefore, a magnitude of a voltage of the touch sensor 430 due to discharge caused by touching the touch sensor 430 may be illustrated by V2. When the finger 420 is small, an amount of discharge V0 to V2 of the touch sensor 430 may be small.

At this time, the amount of discharge V0 to V2 of the touch sensor 430 caused by the small finger 420 may be smaller than the amount of discharge V0 to V1 of the touch sensor 430 caused by the large finger 410.

Therefore, the controller 220 may determine the finger size of the user in accordance with the amount of discharge (the magnitude of the voltage drop) of the touch sensor 430. According to an embodiment, the controller 220 divides the amount of discharge (the magnitude of the voltage drop) of the touch sensor 430 into various levels, determines to which level a measured amount of discharge (a measured magnitude of a voltage) corresponds, and may store information on the corresponding level as the information on the finger size of the user.

Referring to FIG. 3 again, in the operation 350, the controller 220 may determine the information on the illumination around the display device. That is, as described above in connection with FIGS. 1 and 2, the controller 220 may receive the information on the illumination around the display device in accordance with the input of the user, or may receive the information on the illumination around the display device by using the illumination sensor 293.

In the operation 355, the controller 220 may determine the information on the temperature around the display device. That is, as described above in connection with FIGS. 1 and 2, the controller 220 may receive the information on the temperature around the display device in accordance with the input of the user, or may receive the information on the temperature around the display device by using the temperature sensor 297.

Then, the controller 220 may determine the haptic driving voltage by using the user information and/or the user environment information determined in the operations 330 to 355.

At this time, the haptic driving voltage V may be determined by EQUATION 1.

$$V = V_{default} * Y * S * T * N * 1/A * L * Te \quad [\text{EQUATION 1}]$$

Here, V refers to the haptic driving voltage, $V_{default}$ refers to the default haptic driving voltage, Y refers to a factor value in accordance with the age of the user, S refers to a factor value in accordance with the gender of the user, T refers to a factor value in accordance with the current time, N refers to a factor value in accordance with the noise around the display device, A refers to a factor value in accordance with the finger size of the user, L refers to a factor value for the illumination around the display device, and Te refers to a factor value in accordance with the temperature around the display device. At this time, according to an embodiment, any of Y, S, t, N, 1/A, L, and Te are not required and may not exist in accordance with whether the operations 330 to 335 are performed. In addition, according to an embodiment, weight values in accordance with the user may be respectively set for Y, S, t, N, 1/A, L, and Te. For example, when the executed application is sensitive to the age Y of the user, a greater predetermined weight value a may be added to the age Y of the user in comparison with other applications.

In detail, when the age Y of the user is large, the user may prefer that a magnitude of haptic driving be large, as when the age of the user increases, the user grows less sensitive to touch than a young user since callus amounts tend to increases and/or the skin becomes thicker. On the other hand, when the age Y of the user is small, the user may prefer that the magnitude of haptic driving be small. Therefore, the magnitude of the haptic driving voltage may be set in proportion to the age Y of the user. According to an embodiment, the haptic driving voltage may be set in reverse or inverse proportion to the age Y of the user.

When the user is female, the user may prefer that the magnitude of haptic driving be small. In this case, the magnitude of the haptic driving voltage may be reduced by setting the factor value S in accordance with the gender of the user as a value smaller than 1. When the user is male, the user may prefer that the magnitude of haptic driving be large. In this case, the magnitude of the haptic driving voltage may be increased by setting the factor value S in accordance with the gender of the user as a value larger than 1. According to an embodiment, the user may prefer that the magnitude of haptic driving be large when the user is female and the user may prefer that the magnitude of haptic driving be small when the user is male, so that the factor value S may be made smaller than 1 when the user is male and the factor value S may be made larger than 1 when the user is female.

On the other hand, in the case of the current time T, preference for the magnitude of haptic driving may vary in accordance with time zone. For example, at dawn, the user may prefer that the magnitude of haptic driving be small and, at lunch time, the user may prefer that the magnitude of haptic driving be small. When the user is an office worker, the user may prefer that the magnitude of haptic driving be small. At dinner time after work, the user may prefer that the magnitude of haptic driving be large. Therefore, the controller 220 analyzes the user to determine whether the user is a morning person or a night owl for example, and may set a factor value T in accordance with the current time and in accordance with the user.

When the noise N around the display device is large, the user may prefer that the magnitude of the haptic driving be large. The magnitude of the haptic driving voltage may be set in proportion to the noise N around the display device. According to an embodiment, the haptic driving voltage may be set in reverse or inverse proportion to the noise N around the display device.

On the other hand, when the finger size A of the user is large, since a finger area is large, sensitivity to the haptic driving may be large. Therefore, the magnitude of the haptic driving voltage may be set in reverse proportion to the finger size A of the user. According to an embodiment, the haptic driving voltage may be set in reverse or inverse proportion to the finger size A of the user.

When the illumination L around the display device is large, the user may prefer that the magnitude of the haptic driving be large. Therefore, the magnitude of the haptic driving voltage may be set in proportion to the illumination L around the display device. According to an embodiment, the haptic driving voltage may be set in reverse or inverse proportion to the illumination L around the display device.

On the other hand, according to an embodiment, a haptic driving actuator of the haptic driver 170 may be a terpolymer, and the terpolymer may be PVDF-TrFE-CFE. Performance of the terpolymer is in reverse proportion to a dielectric constant. At this time, it is noted that the dielectric constant of the terpolymer is a function of temperature, as illustrated in FIG. 7. That is, when the temperature around the display device is low, the dielectric constant may be reduced so that a drive rate of the terpolymer may increase. Therefore, when the temperature around the display device is low, the controller 220 may set the magnitude of the haptic driving voltage to be low. For example, the haptic driving voltage may be set to be lower in winter than in summer. In summary, since the dielectric constant of terpolymer is a function of temperature, the haptic driving voltage may be set as a function of ambient temperature.

Although not shown, the controller 220 may set the haptic driving voltage to vary in accordance with a biorhythm of the user. For example, the controller 220 calculates the biorhythm of the user from the birth year, month, and date of the user, and may control a driving voltage accordingly. That is, in a date when the biorhythm of the user is high, the controller 220 may set the haptic driving voltage to be low.

In the operation 370 of FIG. 3, the controller 220 may determine whether high frequency driving is required, which is for changing the haptic driving frequency in accordance with a used application of the display device and providing the changed haptic driving frequency to the user. That is, the controller 220 may determine whether high frequency haptic driving is desired for an application to be executed (or that is being currently executed) in the display device.

For example, the user may feel that haptic driving is preferable or positive when the haptic driving frequency is low, and may feel otherwise when the haptic driving frequency is high. That is, the user feels soft, mellow, and tickling when the haptic driving frequency is no more than about 100 Hz and feels unstable, surprised, pushed, and tense when the haptic driving frequency is equal to or greater than about 150 Hz.

Therefore, the controller 220 may set the haptic driving frequency at a high frequency (for example, about 250 Hz) in the operation 385 when a current application of the display device is an alert application such as an alarm. However, when the current application of the display device is a simple input through the input unit 280 such as a character input, that is, a non-alert application such as a touch feedback, the controller 220 may set the haptic driving frequency at a low frequency (for example, about 50 Hz) in the operation 380.

Figure 8:
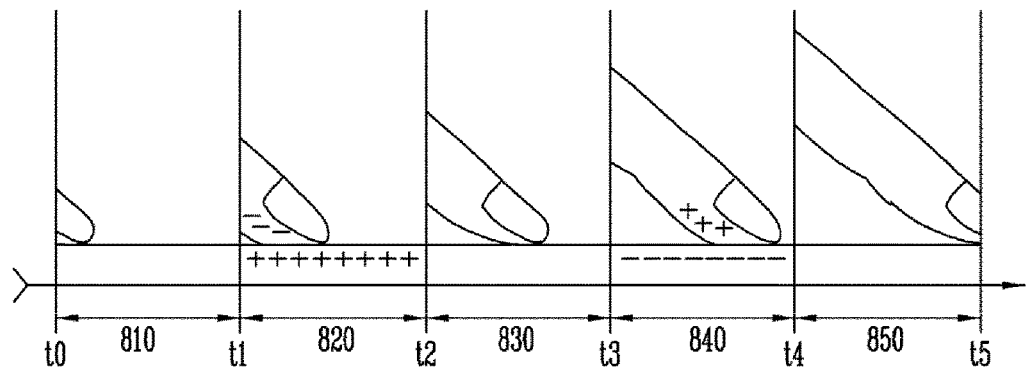
FIG. 8 is a view illustrating an example of a haptic driving method according to an embodiment of the present invention.

FIG. 8 is a view illustrating an example of a haptic driving method according to an embodiment of the present invention.

The haptic driving of the display device according to the embodiment of the present invention may be performed by using an electrostatic method.

Referring to FIG. 8, a transparent electrode such as indium tin oxide (ITO) may be positioned under an insulating body (for example, a glass substrate). A high voltage alternating current (AC) of 100V may be applied to the transparent electrode.

At this time, as illustrated in FIG. 8, in a first period of time t0 to t1 810, a voltage may not be applied. During a second period of time t1 to t2 820, a positive (+) voltage may be applied to an electrode. When this happens, a finger is negatively charged. Then, during a third period of time t2 to t3 830, when a voltage of 0V is applied to the electrode, the finger is not charged. Then, in a fourth period of time t3 to t4 840, when a negative (−) voltage is applied to the electrode, the finger is positively charged. In a fifth period of time t4 to t5 850, when a voltage of 0V is applied to the electrode, the finger is not charged.

A frictional force felt by the finger varies in accordance with a polarity of the voltage applied to the electrode, so that the user may feel haptic feedback from the above alternating voltage.

Therefore, in the above electrostatic haptic driving, the magnitude of the voltage applied to the electrode may vary in accordance with sensitivity of the sense of touch of the user.

Figure 9:
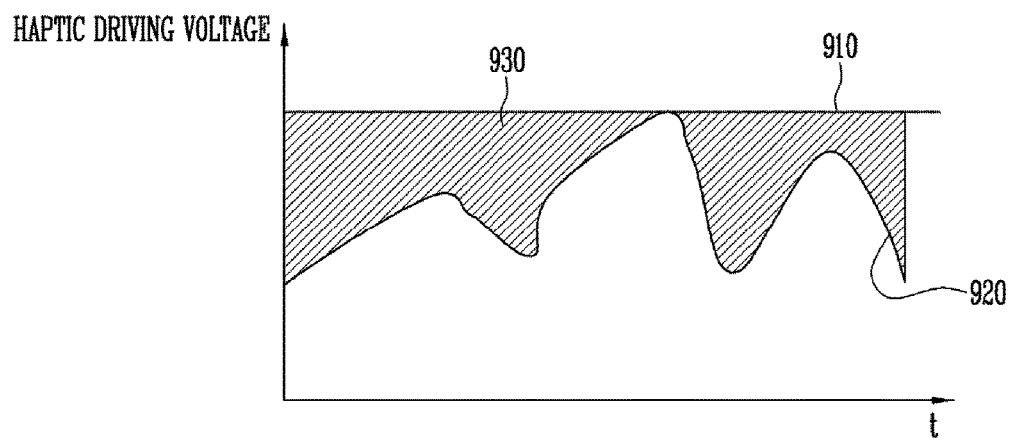
FIG. 9 is a view illustrating an example of a haptic driving voltage of a display device according to an embodiment of the present invention.

FIG. 9 is a view illustrating an example of a haptic driving voltage of a display device according to an embodiment of the present invention.

Referring to FIG. 9, in the display device according to the embodiment of the present invention, as illustrated in 920, the haptic driving voltage may vary in accordance with the user information and/or the user environment information. For example, when the finger size of the user is large, the user is female, the age of the user is small and the display device is located in an environment such as a quiet place with a low temperature, the haptic driving voltage may be reduced. On the other hand, when the haptic driving voltage is not controlled in accordance with the user information and/or the user environment information, as illustrated in 910, it is noted that the driving voltage is uniform. Therefore, in the display device according to the embodiment of the present invention, as illustrated in 930, it is possible to reduce energy consumption in the display device by reducing consumption of the haptic driving voltage.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims. Various features of the above described and other embodiments can be mixed and matched in any manner, to produce further embodiments consistent with the invention.

What is claimed is:

1. A display device comprising:
    a haptic panel configured for a predetermined haptic driving;
    a haptic driver configured to control supply of a haptic driving voltage to the haptic panel; and
    a controller configured to receive at least one of user information and user environment information and to determine the haptic driving voltage according to the received user information and user environment information,
    wherein the haptic panel comprises a touch sensor, and
    wherein the controller is further configured to determine a finger size of a user according to a recharge time after discharge of the touch sensor.

2. The display device of claim 1, wherein the controller is further configured to determine a haptic driving frequency in accordance with an executed application and to control the haptic driver so that the haptic panel is driven according to the haptic driving frequency.

3. The display device of claim 1, wherein the haptic driver comprises a piezoelectric device and a haptic actuator including at least one of a lead zirconate titanate (PZT), Polyvinylidene fluoride (PVDF), terpolymer, eccentric rotating mass (ERM), linear resonant actuator (LRA), or electroactive polymer (EAP) actuator.

4. The display device of claim 1, wherein the controller is configured to receive at least one of an age, a gender, and a finger size of a user.

5. A display device comprising:
    a haptic panel configured for a predetermined haptic driving;
    a haptic driver configured to control supply of a haptic driving voltage to the haptic panel; and
    a controller configured to receive at least one of user information and user environment information and to determine the haptic driving voltage according to the received user information and user environment information,
    wherein the haptic panel comprises a touch sensor, and
    wherein the controller determines a finger size of a user according to an amount of discharge of the touch sensor.

6. The display device of claim 1, wherein the controller receives at least one of a time, a level of noise proximate to the display device, a level of illumination proximate to the display device, and a temperature proximate to the display device.

7. The display device of claim 6, further comprising:
    a timer configured to measure the time;
    a microphone configured to measure the level of noise proximate to the display device;
    an illumination sensor configured to measure the level of illumination proximate to the display device; and
    a temperature sensor configured to measure the temperature proximate to the display device.

8. A method of driving a display device, the method comprising:
    receiving at least one of user information and user environment information;
    determining a haptic driving voltage according to the received user information and user environment information;
    supplying the haptic driving voltage to a haptic panel; and performing haptic driving in accordance with the haptic driving voltage,
wherein the receiving further comprises determining a finger size of a user according to a recharge time after discharge of a touch sensor.

9. The method of claim 8, wherein the performing haptic driving further comprises:
determining a haptic driving frequency according to an executed application; and
driving the haptic panel according to the haptic driving frequency.

10. The method of claim 8, wherein the receiving further comprises receiving at least one of information corresponding to an age, a gender, and a finger size of a user.

11. The method of claim 8, wherein the receiving further comprises determining a finger size of a user according to an amount of discharge of a touch sensor.

12. The method of claim 8, wherein the receiving further comprises receiving at least one of information corresponding to a time, a level of noise proximate to the display device, a level of illumination proximate to the display device, and a temperature proximate to the display device.

* * * * *